US009217646B2

(12) United States Patent
Kornhauser et al.

(10) Patent No.: US 9,217,646 B2
(45) Date of Patent: Dec. 22, 2015

(54) SEMI-AUTONOMOUS ROUTE COMPLIANCE NAVIGATION SYSTEM AND METHOD

(71) Applicant: ALK TECHNOLOGIES, INC., Princeton, NJ (US)

(72) Inventors: Michael Kornhauser, New York, NY (US); Mark Hornung, Skillman, NJ (US); Mike Bodden, Princeton, NJ (US); Igor Vodov, Richboro, PA (US); Craig Fiander, Doylestown, PA (US)

(73) Assignee: ALK Technologies, Inc., Princeton, NJ (US)

( * ) Notice: Subject to any disclaimer, the term of this patent is extended or adjusted under 35 U.S.C. 154(b) by 432 days.

(21) Appl. No.: 13/836,399

(22) Filed: Mar. 15, 2013

(65) Prior Publication Data

US 2015/0253142 A1    Sep. 10, 2015

Related U.S. Application Data

(60) Provisional application No. 61/701,896, filed on Sep. 17, 2012.

(51) Int. Cl.
   *G01C 21/34*    (2006.01)
   *G01S 19/00*    (2010.01)

(52) U.S. Cl.
   CPC ..................... *G01C 21/34* (2013.01)

(58) Field of Classification Search
   USPC .......................................... 701/522; 342/457
   See application file for complete search history.

(56) References Cited

U.S. PATENT DOCUMENTS

| 5,068,656 | A | | 11/1991 | Sutherland |
| 5,262,775 | A | | 11/1993 | Tamai et al. |
| 5,598,167 | A | * | 1/1997 | Zijderhand ................... 342/457 |
| 5,689,423 | A | | 11/1997 | Sawada |
| 5,878,368 | A | | 3/1999 | DeGraaf |
| 6,052,645 | A | * | 4/2000 | Harada ......................... 701/423 |
| 6,107,944 | A | | 8/2000 | Behr et al. |
| 6,459,987 | B1 | * | 10/2002 | Krull et al. .................... 701/410 |
| 6,611,755 | B1 | * | 8/2003 | Coffee et al. ................. 701/482 |

(Continued)

FOREIGN PATENT DOCUMENTS

WO     WO-2010111833     10/2010

OTHER PUBLICATIONS

"ALK Map Data and Development Roadmap" Presented May 5, 2011at the ALK Technology Summit, slides 26-28.

*Primary Examiner* — Thomas G Black
*Assistant Examiner* — Tyler Paige
(74) *Attorney, Agent, or Firm* — Robert J. Sacco; Fox Rothschild LLP

(57) ABSTRACT

A method and system for detecting that an object, person or vehicle has deviated in space or time from its prescribed route, and guiding it back to the prescribed route, according to strictness criteria predefined by a controlling authority or authorities. The invention allows controlling authorities to pre-specify a level of strictness suiting the object, person or vehicle and purpose of travel, by which the object, person or vehicle is guided back to the prescribed route autonomously, enabling return to route according to established policies, without the necessity of further communication with controlling authorities. The method and system thus operate semi-autonomously, with strictness parameters predefined by the central authorities, and the object, person or vehicle operating with some degree of latitude within those strictness parameters.

22 Claims, 7 Drawing Sheets

(56) References Cited

U.S. PATENT DOCUMENTS

| | | |
|---|---|---|
| 6,718,235 B1 | 4/2004 | Borugian |
| 6,839,627 B1 | 1/2005 | Bauch |
| 6,892,133 B2 | 5/2005 | Kornhauser et al. |
| 7,024,287 B2 | 4/2006 | Peckham et al. |
| 7,149,625 B2 | 12/2006 | Mathews et al. |
| 7,385,500 B2 | 6/2008 | Irwin |
| 7,406,381 B2 | 7/2008 | Obata |
| 7,945,386 B2 | 5/2011 | Lokshin et al. |
| 2001/0005809 A1* | 6/2001 | Ito ................................ 701/210 |
| 2005/0043884 A1 | 2/2005 | Atarashi |
| 2005/0102098 A1* | 5/2005 | Montealegre et al. ......... 701/209 |
| 2006/0116816 A1* | 6/2006 | Chao et al. .................... 701/210 |
| 2006/0206261 A1* | 9/2006 | Altaf et al. .................... 701/209 |
| 2007/0179709 A1* | 8/2007 | Doyle ............................ 701/209 |
| 2008/0275636 A1 | 11/2008 | Hirose |
| 2009/0125229 A1* | 5/2009 | Peri et al. ...................... 701/201 |
| 2010/0125406 A1* | 5/2010 | Prehofer ....................... 701/201 |
| 2010/0259370 A1* | 10/2010 | Chen et al. ................... 340/425.5 |
| 2011/0213548 A1 | 9/2011 | Tashiro |
| 2013/0096821 A1* | 4/2013 | Wong et al. ................... 701/428 |

* cited by examiner

SEMI-AUTONOMOUS ROUTE COMPLIANCE NAVIGATION SYSTEM AND METHOD

CROSS-REFERENCE TO RELATED APPLICATIONS

This application claims the benefit of Provisional Patent Application Ser. No. 61/701,896, filed Sep. 17, 2012 by the present inventors, which is incorporated herein by reference in its entirety.

BACKGROUND OF THE INVENTION

In recent years, computerized navigation and route guidance systems have come into common use among consumers as well as transportation professionals to assist drivers and pedestrians in navigating a network to reach their destination. Such systems are also currently being adapted to guide autonomous robots and robotized vehicles. If a person or robot is delayed along a planned route or deviates from a planned route either inadvertently (such as by becoming stuck in unexpected traffic, by making a wrong turn, or by being directed by police to make a detour) or intentionally (to seek fuel or food, or to go around stalled traffic), there is a need to detect this situation and recalculate a new route to continue on to the destination. A computerized navigation system will typically do so by calculating a new best route to the destination, ignoring the previously planned route, or it may calculate a best route back to the previously planned route, or, such as in the case of changing traffic conditions, it may calculate alternative routes that incorporate the latest real-time traffic information. The system may provide one route by default, or it may propose alternatives for the person navigating to choose from. Such systems are suitable for situations in which a driver or pedestrian is ultimately responsible for and has a large degree of control over the decision-making as to which route to take, and strict adherence to a prescribed route is not required.

In other situations, it is not allowable or desirable for a driver or pedestrian, or feasible for a robot, to be completely responsible for route decision-making. For example, it may not be allowable for dangerous, oversize or overweight cargo to move other than on a prescribed route, or for a parolee to deviate from a set route to and from work, or it may not be desirable to let a person of limited experience or faculties be responsible for route decision-making, or it may be desirable from an efficiency or quality standpoint to give a driver or pedestrian expert guidance as to which route to take. In these situations, the driver or pedestrian's navigation system must typically receive initial routing instructions from a controlling authority, such as a dispatcher or supervisor, and then, if they go out-of-route or fall behind schedule, contact that controlling authority, report where they are out-of-route, and await new instructions. This process of contacting and waiting for new instructions may be infeasible if there is a gap in communications coverage, or it may be time-consuming and inefficient if the controlling authority only works certain shifts or has a lengthy work queue, or it may be uneconomic.

In circumstances where a controlling authority has at least partial responsibility for routing decisions, it is often desirable from an efficiency perspective to pre-authorize the driver or pedestrian to make certain deviations from and return to a prescribed route on their own authority, such as to stop for a short time at an interstate exit for food or fuel and return to the interstate at that same exit. But in certain cases, such as the shipment of munitions, even short deviations, or stopping for a short time along a prescribed route without deviating, may be undesirable due to security concerns. Different cases may also apply to how the driver or vehicle needs to react if they stop for a longer time or make a longer deviation off-route, ranging from the pleasure traveler who is free to stop or drive anywhere on a whim, to the transporter of an oversize or overweight load who must strictly follow a prescribed route at a particular time that has been pre-cleared to handle a vehicle of their size and weight.

U.S. Pat. Nos. 5,068,656 and 6,839,627 describe systems and methods for detecting out-of-route events for trucks and reporting these to a central dispatcher. U.S. Pat. No. 6,718,235 describes a method and apparatus for determining that a vehicle has deviated from a planned route in excess of a predetermined limit and shutting down the vehicle unless or until a central authority authorizes otherwise. U.S. Pat. No. 7,385,500 describes a system and method for detecting events for mobile assets and reporting these to a variety of interested parties. These systems, methods and apparatus detect and report in a "black box" fashion, without provision to provide any navigation or route guidance.

U.S. Pat. No. 5,262,775 describes a navigation system that detects deviations from a calculated route, alerts the driver, and allows the driver to request computation of a new route. U.S. Pat. No. 5,689,423 describes a system for computing return routes to a planned route for each potential deviation from the planned route, and warning the driver in advance of each potential deviation whose incremental return route cost exceeds a threshold. U.S. Pat. No. 7,024,287 describes an autopilot system that, following a manual deviation from an original route, automatically chooses which waypoint along the original route to return to. U.S. Pat. No. 7,945,386 describes a device and method for detecting that a vehicle has deviated from an original route, determining reroutes to one or more intermediate points along the original route, and selecting a reroute based on cost. U.S. application 2008/0275636 describes an apparatus and method for determining that a vehicle has deviated from a planned route, and if so, determining if it deviated before a planned intermediate point, and if so, determining whether to continue to route via the intermediate point, and if so calculating a new route to the final destination via the intermediate point, otherwise calculating a route direct to the destination. U.S. application 2011/0213548 describes a navigation system that determines whether to recalculate a route depending on a tolerance of deviation from the original route. These systems, device and method are completely autonomous and do not receive any instructions from or send any information to a controlling authority.

U.S. Pat. Nos. 6,052,645, 6,107,944, 6,892,133, 7,149,625 and 7,406,381, and U.S. application Ser. No. 2005/0043884 describe methods, systems and apparatus for client/server and distributed navigation systems. While the computing power of these systems is distributed, the authority and control over route choice is not distributed.

U.S. Pat. No. 5,878,368 describes a navigation system with user definable cost values, including the ability for a user to designate particular road segments to avoid or favor. However, the authority to make such a designation rests entirely with the end user in the vehicle, it is not distributed.

International application publication WO2010/111833 A1 describes a method and program for displaying points of interest that can be reached from a planned route within a threshold cost, and can return to the planned route within a second threshold cost, and the sum of the two costs is less than a third threshold cost. This method and program do not determine whether a vehicle actually deviates from a planned route, and does not incorporate selecting among varying criteria of strictness for detecting such a deviation or for returning to the planned route.

In a presentation by the inventors titled "ALK Map Data and Development Roadmap" presented May 5, 2011 at the ALK Technology Summit, slides 26-28 refer to the general concept of a dispatching system sending a prescribed route to a navigation system, and the navigation system thereafter following the prescribed route as a preference versus a requirement versus how strongly to follow the route.

SUMMARY

Briefly described, the invention comprises a system and method for navigation and route guidance by an object, person or vehicle along a network, in which deviations from a prescribed route are detected and the object, person or vehicle is guided back to the prescribed route according to strictness criteria predefined by a controlling authority or authorities.

According to the present invention, a controlling authority, such as a dispatcher, is responsible for assigning a destination and prescribing the route the object, person or vehicle is to follow to that destination, predetermining strictness criteria for staying on route and detecting out-of-route, and predetermining strictness criteria for return-to-route. The object, person or vehicle is responsible for following the route to destination within the limits of strictness defined by the controlling authority, and if the object, person or vehicle does not or cannot do this, to follow the strictness criteria for return-to-route. The present invention is embodied in a system consisting of a controlling authority's computer (server), an object, person or vehicle's computer (client), and a means of communication between them.

A unique aspect of this invention is the way in which the traveling object, person or vehicle operates semi-autonomously. The traveling object, person or vehicle is responsible for detecting they are out-of-route and returning to route according to criteria predetermined by the controlling authority, without the necessity of real-time communication with the controlling authority during travel.

DETAILED DESCRIPTION

Figure 1:
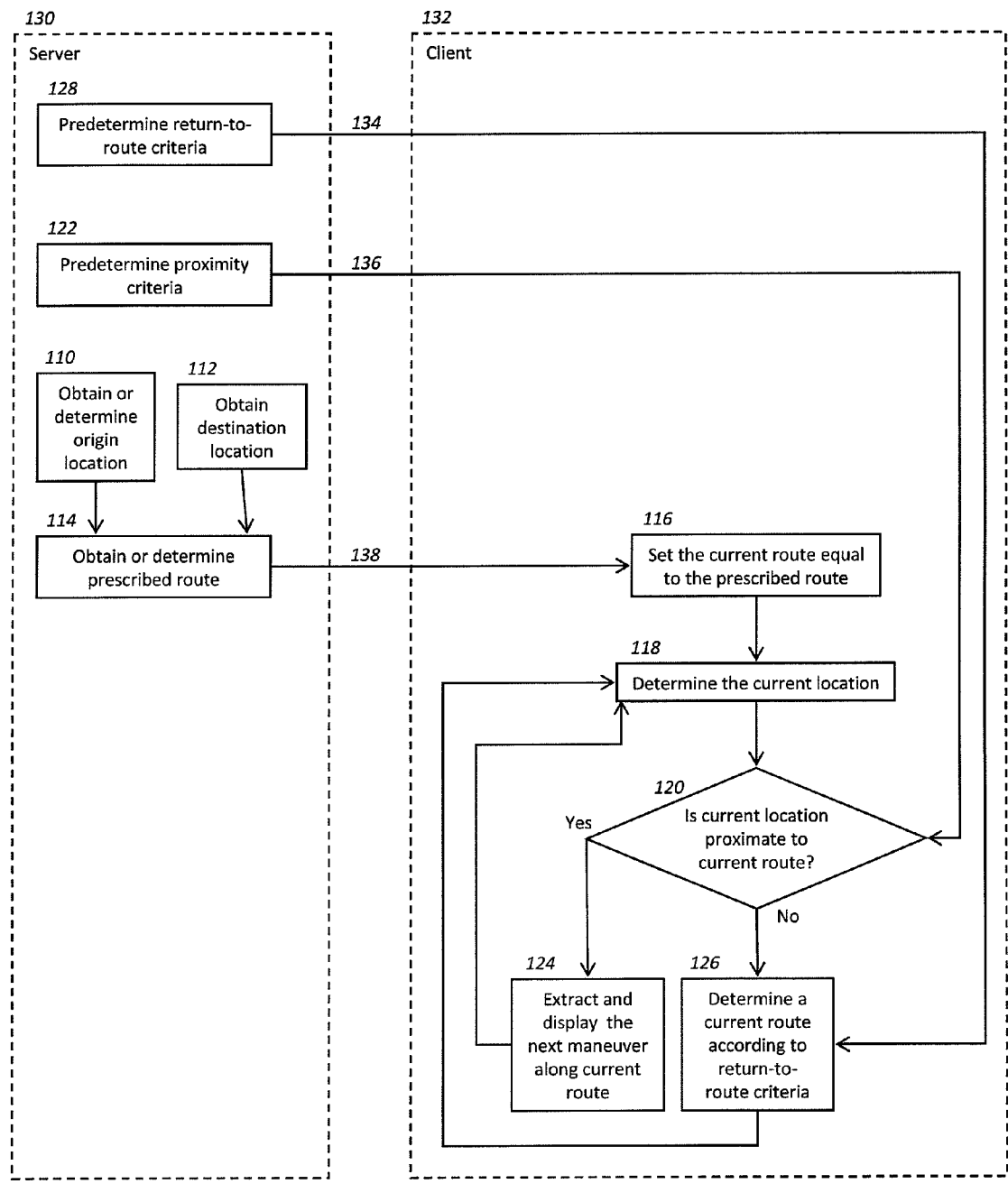
FIG. 1 is a flowchart illustrating the method and system.

Example implementations of the disclosed scenarios are described with reference to the attached figures. The figures are not drawn to scale and they are provided merely to illustrate the instant invention. Several aspects are described below with reference to example applications for illustration. It should be understood that numerous specific details, relationships, and methods are set forth to provide a full understanding of the disclosed implementations. One having ordinary skill in the relevant art, however, will readily recognize that the invention can be practiced without one or more of the specific details or with other methods. In other instances, well-known structures or operation are not shown in detail to avoid obscuring the invention. The disclosed implementations are not limited by the illustrated ordering of acts or events, as some acts may occur in different orders and/or concurrently with other acts or events. Furthermore, not all illustrated acts or events are required to implement a methodology in accordance with the disclosed scenarios.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Referencing the foregoing background, it does not appear that anyone has heretofore solved the problem of semi-autonomous navigation, in which an object, driver or vehicle is to move autonomously along a prescribed route, yet may need to deviate from that route for whatever reason and in that event needs guidance to return to route in a way that satisfies the controlling authority's criteria, without having to contact the controlling authority and wait to receive new instructions.

For these reasons, it is desirable to have a route compliance navigation system that operates neither completely autonomously nor completely under the control of a central authority, which gives a controlling authority the capability to predetermine, for each trip, depending on the characteristics of the vehicle, driver, passengers, cargo, terrain, and/or purpose, the tolerance for determining off-route events, and the rules to follow afterwards, and to communicate these at the start of the trip to the person, robot or vehicle's navigation system, so that if they go off route, they can be guided according to the controlling authority's rules without necessarily needing to receive new instructions from the controlling authority. In some situations, there may be multiple controlling authorities, for example for oversize or overweight loads a governmental authority may prescribe the route of travel while the customer at destination prescribes the time of arrival. In these situations, it is desirable to have a system that coordinates the instructions of the various controlling authorities.

The disclosed implementations relate to a system and method for navigation and route guidance by an object, person or vehicle along a network, in which deviations in space or time from a prescribed route are detected and the object, person or vehicle is guided back to the prescribed route, with both the detection and guidance being according to varying levels of strictness criteria predefined by one or more controlling, central authorities. In a scenario, a system and method operate semi-autonomously, with strictness parameters predefined by the central authorities, and the object, person or vehicle operating with some degree of latitude within those strictness parameters.

Referring now to FIG. 1, a flow chart is provided illustrating which functions are performed by the controlling authority using a server 130 and which by the traveling object, person or vehicle using a client 132. Also shown is the information transferred from the controlling authority (i.e. server 130) to the traveling object, person or vehicle (i.e. client 132). This flowchart illustrates the combination of communication from a server 130 of proximity and return-to-route criteria 122, 128 (transmitted data 134, 136) prior to departure, with a feedback loop during travel (118, 120, 124, 126) that is contained entirely within the client 132. The client may follow the server's predefined criteria on how to return to the prescribed route, without the client needing to communicate with the server during travel.

In an implementation, the server 130 determines return-to-route criteria 128 and proximity criteria 122. The server 130 also obtains or determines an origin location 110 and a destination location 112. Using the origin location and destination location, the server 130 determines a prescribed route 114. Prescribed route 138, proximity criteria 136, and return-to-route criteria 134 are transmitted to a client 132. At client 132, the current route 116 is set to equal the prescribed route 114. Client 132 then determines a current location 118 and determines whether current location is proximate to the current route 120. In making this determination, client 132 utilizes the proximity criteria to compare the current location with the current route. For example: if the proximity criteria is X kilometers, determine whether the current location is within X kilometers of the route; as another example, if the proximity criteria is X kilometers and Y minutes, determine whether the current location is within X kilometers of the route and within Y minutes of the destination along the route according to the current estimated travel time along the route to the destination considering current traffic conditions and the most recent expected traffic conditions. If the current location is proximate to the current route (120: Yes), client 130 extracts and displays for execution the next maneuver along the current route 124. The client then returns to determine the current location 118. If, however, the current location is not proximate to the current route (120: No), client 132 determines a new current route according to return-to-route criteria 134. For example: if the return-to-route criteria is very strict, determine the new current route as backtracking along the deviation back to the point of deviation; if less strict, as the least-cost route to the point of deviation, or to the nearest point on the prescribed route, or, to any of a range of nearest points on the prescribed route; if not strict at all, as the least-cost route to the destination irrespective of the prescribed route. Once the new route is determined, client 132 returns to determine the current location 118.

Figure 2:
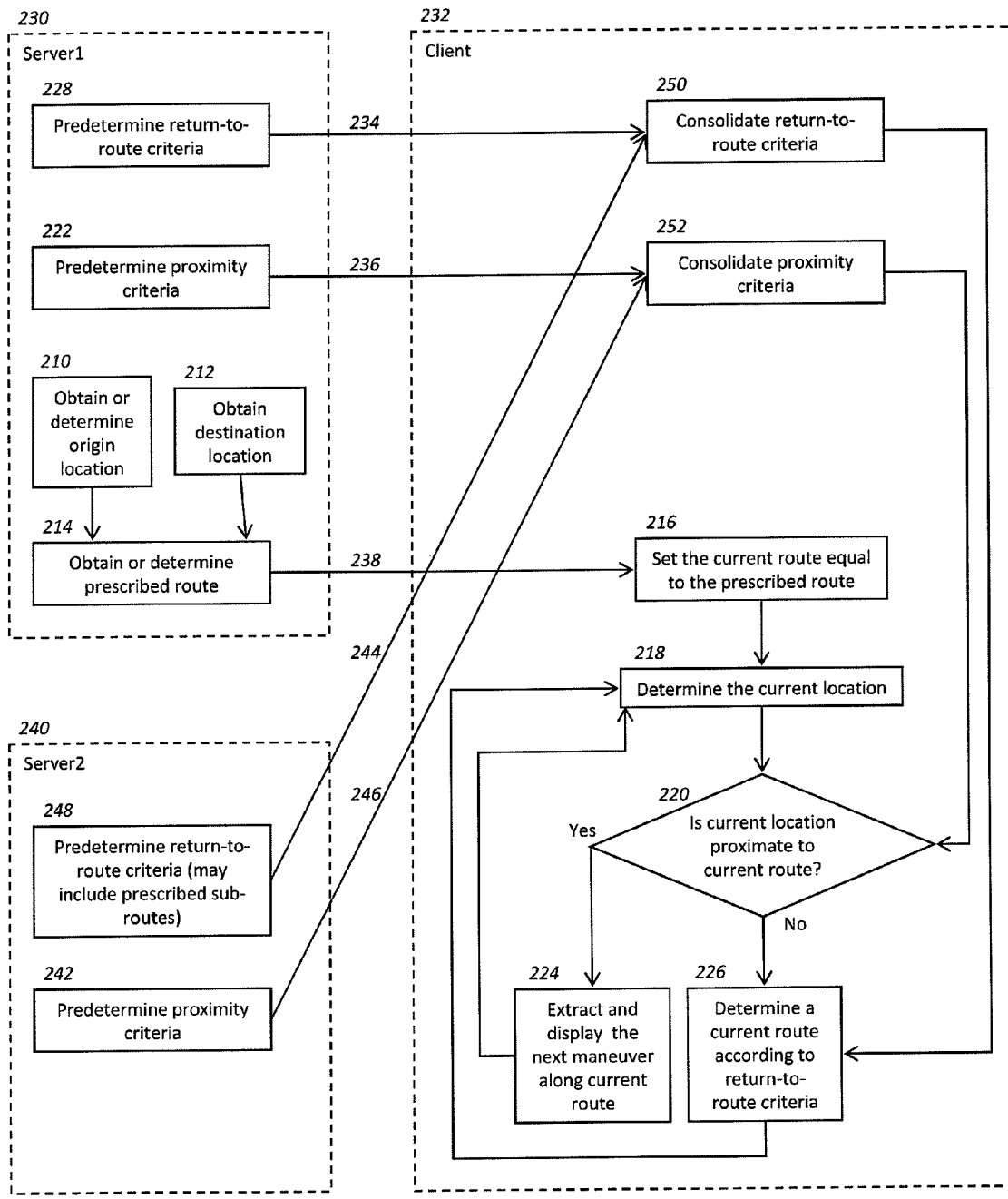
FIG. 2 is a flowchart illustrating the method and system incorporating more than one controlling authority.

Referring now to FIG. 2, the flexibility of the disclosed scenarios to accommodate multiple controlling authorities (i.e., servers 230, 240) is illustrated. Each server 230, 240 includes their own proximity and return-to-route criteria 234, 236 and 244, 246, respectively. The client 232 includes logic to consolidate these criteria 250, 252 for use by the feedback loop 218, 220, 224, 226.

In an implementation, the server 230 determines return-to-route criteria 228 and proximity criteria 222. The server 230 also obtains or determines an origin location 210 and a destination location 212. Using the origin location and destination location, the server 230 determines a prescribed route 214. The server 230 transmits prescribed route 238, proximity criteria 236, and return-to-route criteria 234 to a client 232. A second, independent server 240, also determines return to route criteria 248 and proximity criteria 242. The second server 240 transmits proximity criteria 246 and return-to-route criteria 244 to the same client 232. At client 232, Return to route criteria 234, 244 are consolidated 250. For example, the first server may be that of a fleet dispatcher and the second server that of a governmental authority, and in the event of a road closure, the governmental authority may choose to mandate a particular detour route around the closure, in which case the consolidation process would substitute the mandated detour route for a section of the route prescribed by the fleet dispatcher. Additionally, proximity criteria 236, 246 are consolidated 252. For example, the first server may be that of a fleet dispatcher and the second server that of a governmental authority, and in the event of a road closure, the governmental authority may choose to mandate a stricter proximity criteria for its mandated detour route than the proximity criteria set by the fleet dispatcher, in which case the consolidation process would substitute the stricter proximity criteria for the mandated detour route. At client 232, the current route 216 is set to equal the prescribed route 214. Client 232 also determines a current location 218 and determines whether current location is proximate to the current route 220. In making this determination, client 232 utilizes the proximity criteria 252 to compare the current location with the current route. If the current location is proximate to the current route (220: Yes), client 230 extracts and displays the next maneuver along the current route 224. The client then returns to determine the current location 218. If, however, the current location is not proximate to the current route (220: No), client 232 determines a new current route according to return-to-route criteria 250. Once the new route is determined, client 232 returns to determine the current location 218.

Figure 3:
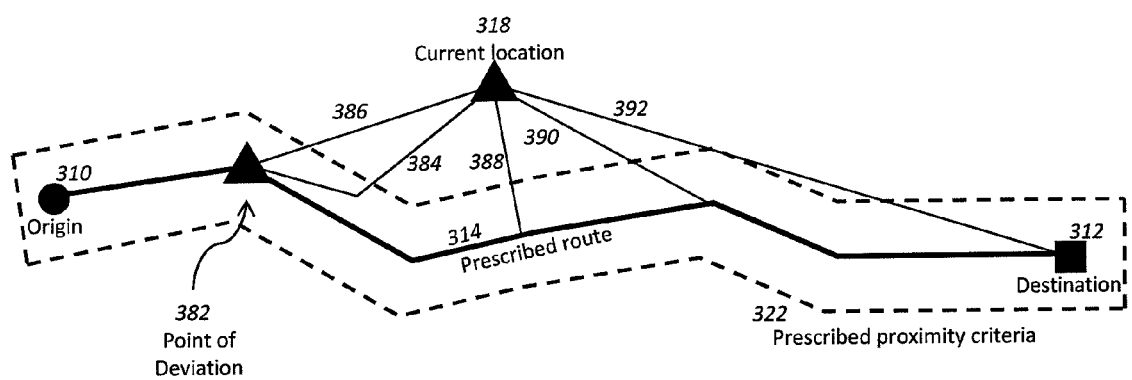
FIG. 3 is a diagram of a prescribed route.

Referring now to FIG. 3, a diagram of a prescribed route 314 navigating a path between origin 310 and destination 312. Illustrated as a dashed outline, prescribed proximity criteria 322 defines the maximum distance the client can deviate before the return-to-route requirements are triggered. A deviation 384 begins at point of deviation 382 and continues outside the proximity criteria 322 to a current location 318. Various alternative paths to return to the prescribed route 384, 386, 388, 390, 392 exist. In various implementations, the controlling authority or authorities can predetermine return-to-route criteria appropriate to the trip, vehicle, driver, load, and/or destination. These, in turn, can determine which alternative path is chosen by the navigation system. For example: if the return-to-route criteria is very strict, determine the new current route as backtracking along the deviation 384 back to the point of deviation; if less strict, as the least-cost route to the point of deviation 386, or to the nearest point on the prescribed route 388, or, to any of a range of nearest points on the prescribed route 388, 390; if not strict at all, as the least-cost route to the destination irrespective of the prescribed route 392.

Figure 4:
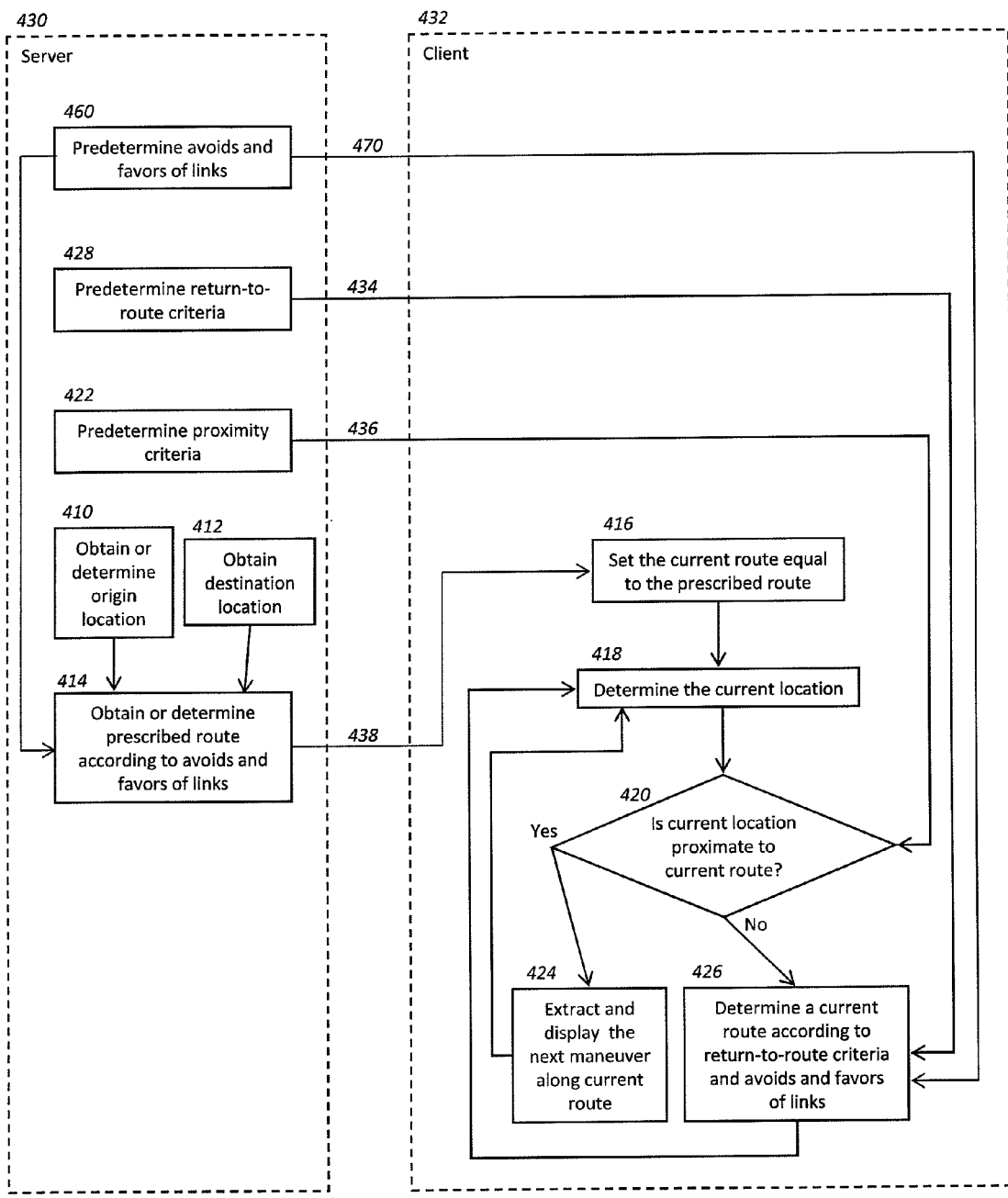
FIG. 4 is a flowchart illustrating the method and system incorporating avoids and favors.

Referring now to FIG. 4, a flowchart is provided that illustrates another implementation, similar to FIG. 1, but modified to introduce predetermined avoids and favors of links 460. Avoids and favors are a means for a controlling authority to adjust the default impedances on the links of the network to suit their needs and preferences, a feature of particular utility when the controlling authority is licensing network routing data from a vendor and using that vendor's default impedances, and wants to customize a small subset of those impedances to meet particular needs. For example, the vendor's default impedances may not consider altitude, but a controlling authority for shipments of bags of potato chips packaged at sea level may want to avoid all links over 8,000 feet so as to avoid bags popping during transit. As another example, a fleet dispatcher may want to favor one of two parallel roads on which its fleet maintenance facility is located, so that routes are more likely to pass by its facility, making it easier to do fueling or maintenance at its facility while minimizing out-of-route distance.

In an implementation, the server 430 determines return-to-route criteria 428, proximity criteria 422, and avoids and favors 460. The server 430 also obtains or determines an origin location 410 and a destination location 412. Using the origin location and destination location, the server 430 determines a prescribed route 414, taking into consideration the predetermined avoids and favors 460. Prescribed route 438, proximity criteria 436, return-to-route criteria 434, and avoids and favors 470 are transmitted to a client 432. At client 432, the current route 416 is set to equal the prescribed route 414. Client 432 also determines a current location 418 and determines whether such current location is proximate to the current route 420. In making this determination, client 432 utilizes the proximity criteria to compare the current location with the current route as described above in reference to FIG. 1. If the current location is proximate to the current route (420: Yes), client 430 extracts and displays the next maneuver along the current route 424. The client then returns to determine the current location 418. If, however, the current location is not proximate to the current route (420: No), client 432 determines a new current route 426 according to return-to-route criteria 434, taking into consideration the predetermined avoids and favors 460. Once the new route is determined, client 432 returns to determine the current location 418.

Figure 5:
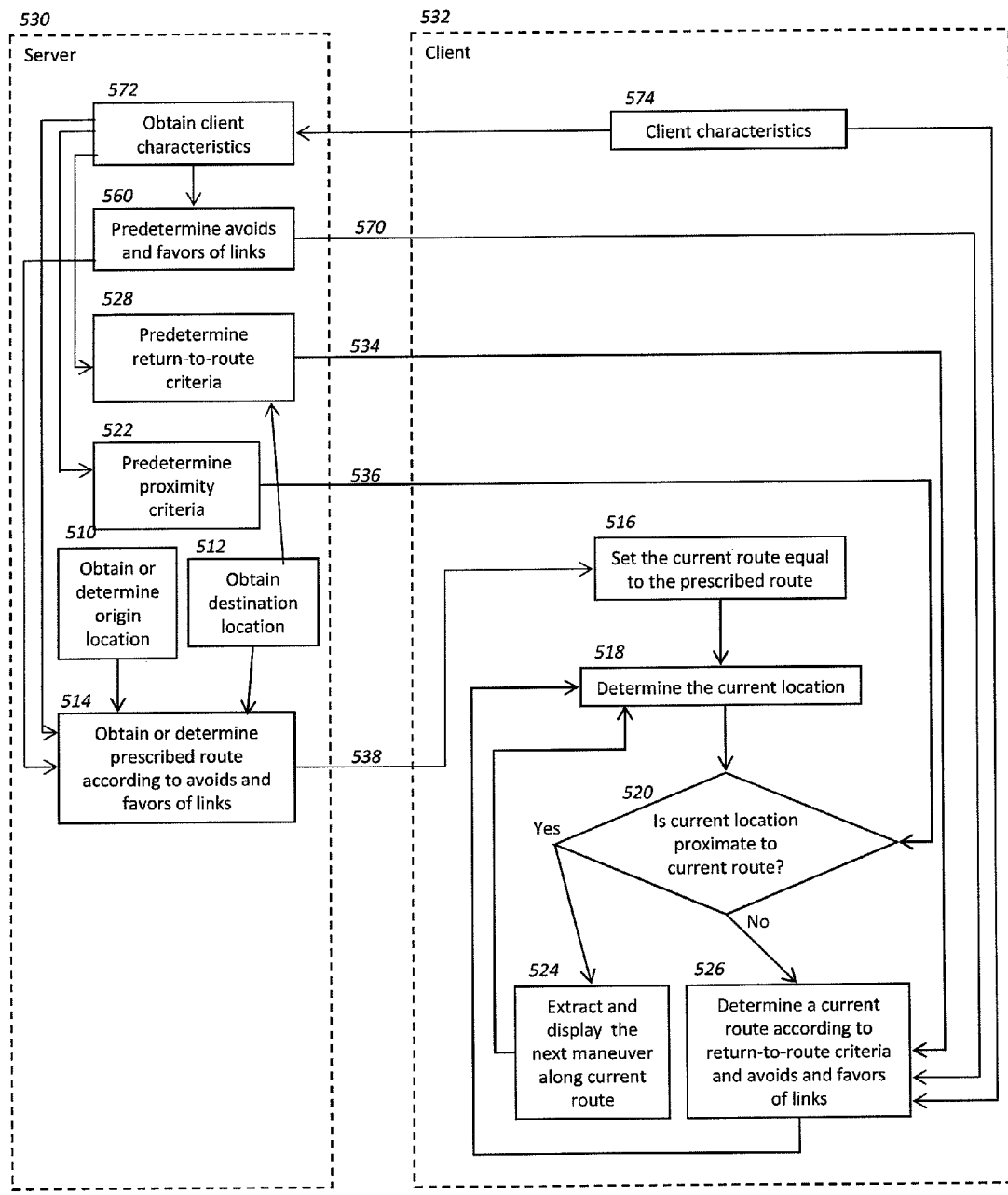
FIG. 5 is a flowchart illustrating the method and system incorporating client characteristics.

Referring now to FIG. 5, a flowchart is provided that illustrates another implementation. FIG. 5 is similar to FIG. 4 except that it is modified to introduce the controlling authority obtaining client characteristics 572, such as size and weight of the client vehicle 574, which are then considered in determining avoids and favors of links 560, return-to-route criteria 528, and/or proximity criteria 522, and in determining the prescribed route 514. Client 532 uses those same characteristics in determining the current route 526. For example, a controlling authority may dispatch trucks of varying dimensions and gross weights, and will want to determine prescribed routes and current routes on which the trucks' dimensions will fit and which have pavement and bridge characteristics that will support the trucks' weight, and may want to have stricter proximity criteria and return-to-route criteria for oversize or overweight vehicles. As another example, a controlling authority may dispatch trucks carrying varying types of cargo, and wants to choose among sets of avoids and favors that are suited to those types of cargo, for example that avoid high altitudes for altitude-sensitive product, or that avoid high-crime areas for high-value product.

In an implementation, the server 530 obtains client characteristics 572. Server 530 also determines return-to-route criteria 528, proximity criteria 522, and/or avoids and favors 560. The server 530 also obtains or determines an origin location 510 and a destination location 512. Using the origin location and destination location, avoids and favors, and client characteristics, the server 530 determines the a prescribed route 514. Prescribed route 538, proximity criteria 536, return-to-route criteria 534, and avoids and favors 570 are transmitted to a client 532. At client 532, the current route 516 is set to equal the prescribed route 514. Client 532 also determines a current location 518 and determines whether current location is proximate to the current route 520. In making this determination, client 532 utilizes the proximity criteria to compare the current location with the current route as described above in reference to FIG. 1. If the current location is proximate to the current route (520: Yes), client 530 extracts and displays the next maneuver along the current route 524. The client then returns to determine the current location 518. If, however, the current location is not proximate to the current route (520: No), client 532 determines a new current route according to return-to-route criteria 534, avoids and favors 560, and client characteristics 574. Once the new route is determined, client 532 returns to determine the current location 518.

Advantageously, a server and a client (e.g., server 130 and client 132) include separate means (e.g., 114, 126) to determine routes along a network by a controlling authority (server computer) and by a traveling object, person or vehicle (client computer). Each means includes a map database defining the network, and a route-finding algorithm to determine routes between any two locations on the network, based on minimizing impedance, which is the sum of cost (which could be distance, time, dollars, or other measures of cost) along the network. These means need not be identical, but to the extent they are similar, the amount of information required to define the prescribed route, as well as return-to-route criteria, proximity criteria, and avoids and favors, can be less, saving on communication time and cost.

The prescribed route can be communicated from the server to the client in a variety of formats. If the map databases and the route-finding algorithms on the server and client computers are identical, then the prescribed route can be unambiguously defined solely by means of origin and destination link IDs and routing criteria such as fastest or shortest. If the map databases are identical but the route-finding algorithms are not identical, the prescribed route can be unambiguously defined by a sequence of link IDs. If the map databases are not identical, the prescribed route can be defined as a sequence of locations in 2-dimensional space (such as by latitude and longitude) that are spaced densely enough to unambiguously define the sequence of network links by comparison to the locations of the start, end, and intermediate shape points of the network links. In the case of air travel using a network of airways in 3-dimensional space (such as defined by latitude, longitude and altitude), the prescribed route can be defined as a sequence of latitude/longitude/altitude locations. In any case, the expected time of arrival at each point in sequence must be included if the proximity criteria require the client to determine whether it is proximate to the current route in both space and time.

These route determination means (e.g., 114, 126) can be performed on computers located anywhere provided that communications with their users is in place and reliable at the time route determination is performed. For example, the client computer route determination means (e.g., 126, 226, 426, 526) could be located at a fixed location that communicates with a location determination means (e.g., 118, 218, 418, 518), proximity determination means (e.g., 120, 220, 420, 520), and display means (e.g., 124, 224, 424, 524) on the vehicle, the typical configuration of a "thin client" navigation system. However, since wireless communication is inherently less reliable than wired communication, the entirety of the feedback loop (e.g., 118, 120, 124, 126) would ideally be contained within a mobile computer, such as a smartphone or a vehicle-mounted computer, that travels with the traveling object, person or vehicle, the typical configuration of a "thick client" navigation system.

The controlling authority (server computer) is connected to the traveling object, person, or vehicle (client computer) by at least one means of communication, at least as often as the controlling authority needs to communicate changes in its instructions to the traveling object, person, or vehicle, which can be as infrequently as once per trip, prior to departure. Since continuous communications are not required, a variety of local-area, non-ubiquitous communications means, such as a wireless local area network (Wi-Fi) or dedicated short-range communications (DSRC), can be used in addition to or as alternatives to long-range communications means, such as cellular telephone or satellite. At a minimum, a one-way means of communication is required from the controlling authority to the traveling object, person or vehicle at or prior to departure. Optionally, two-way communications would allow the traveling object, person or vehicle to report back to the controlling authority when it determines it is out-of-route or behind schedule, when it returns to route or returns to schedule, and the amount of distance out-of-route and/or time gained or lost relative to schedule. The controlling authority could then use this information to manage affairs at the destination (such as to prepare for a late arrival), to manage drivers (such as to reward drivers for on-time, on-route performance), and to gather information to update its map database (such as to update expected travel times on links).

Various implementations enable a controlling authority to define strictness criteria to be used by the traveling object, person or vehicle to determine whether it is proximate to the prescribed route (in space and in time), and, if it is not, strictness criteria to be used to return to the prescribed route. The proximity criteria can be defined as a distance and an absolute amount of time that apply to the entire route, or as a function where distance and time are larger further from the destination and smaller closer to the destination. More importantly, the proximity criteria can be made to vary based on the physical characteristics of the vehicle, the nature of the cargo or of the person being transported, the nature of the destination, and the purpose of the trip.

As one example, a very small distance and a very short time would be suitable for munitions shipments, which for security reasons are not to stop even for a short time in a non-secure location. As a second example, a very small distance but a somewhat larger time would be suitable for oversize/overweight shipments, which must follow a prescribed route for physical reasons but can be somewhat more flexible in stopping. As a third example, a larger distance and time (such as 1 mile and 1 hour) would be suitable for general cargo, to allow for driver discretion in seeking food, fuel, or restroom facilities. As a fourth example, a larger distance but a small amount of time (such as 1 mile and 15 minutes) would be suitable for a vehicle such as a concrete mixer, whose cargo is highly perishable. As a fifth example, a larger amount of time would be suitable for a destination with a larger time window for delivery, such as a warehouse, while a shorter amount of time would be suitable for a destination with a shorter time window for delivery, such as a cross-dock facility.

The return-to-route criteria can be defined as finding the best current route to the destination regardless of the prescribed route (least strict), or finding the best route to a reasonably nearby point on the prescribed route (less strict), or finding the best route to the absolutely nearest point on the prescribed route (more strict), or backtracking along the route of deviation (most strict). The least strict return-to-route could be most suitable for general cargo, the less strict for high-value cargo, the more strict for munitions, and the most strict for oversize/overweight cargo. "Nearest" or "nearby" could be defined by distance, time, or impedance, and "reasonably nearby" could be defined as a sliding scale from absolutely favoring the prescribed route (such as favoring the links of the prescribed route by 1000:1 over other links, or avoiding other links by 1000:1 compared to the prescribed route's links) to not favoring the prescribed route's links or avoiding the other links at all.

The controlling authority can further define return-to-route criteria by transmitting as part of those criteria instructions to avoid or favor certain roads irrespective of the prescribed route. For example they may wish to avoid roads that have a history of accidents or security problems for their fleet, or to favor roads that have contracted fueling facilities or secure rest areas, or to favor roads that are pre-designated as detour routes or alternative routes.

The invention also provides for the situation of more than one controlling authority for a trip. For example a truck may be under control of a dispatcher from the standpoint of time, but under the control of a government authority from the standpoint of the roads to be followed, and/or of alternate roads to use if those cannot be followed. As an example, many government authorities have predefined detour routes to be used between interstate highway exits when the interstate must be closed due to a traffic accident, rockslide, or severe weather. These detour routes could be communicated to drivers' navigation systems ahead of departure from origin, and if the navigation system then determines that the driver is off the prescribed route, it could favor using these predetermined detour routes in its routing back to the prescribed route. Alternatively, in the event that a road must be closed unexpectedly and a detour set up, the government controlling authority could, at the point of diversion, communicate to those vehicles (such as by using short-range communication) the detour routes they must follow to return to their routes, and by pre-arrangement this would override whatever criteria had been set up by the vehicle's dispatcher and/or earlier by the government authority.

Figure 6:
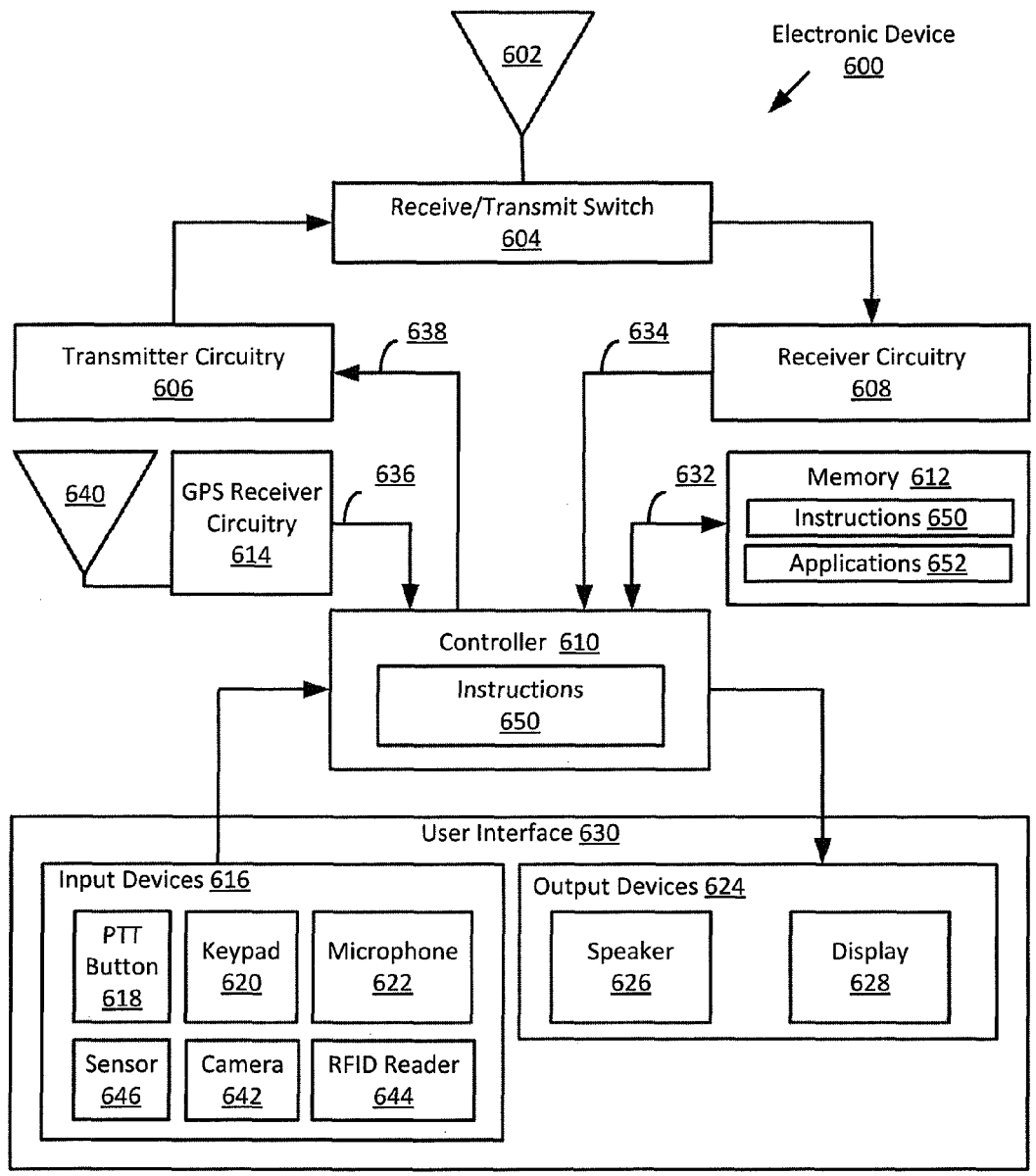
FIG. 6 is a block diagram showing an example electronic device.

Referring now to FIG. 6, there is provided a more detailed block diagram of an electronic device 600 (e.g., client 132, 232, 432, 532). The electronic device 600 will be described herein as comprising a navigation device. However, the disclosed implementations are not limited in this regard. For example, the electronic device can alternatively comprise a smartphone, a notebook computer, a laptop computer, a PDA, or a tablet Personal Computer ("PC").

Notably, the electronic device 600 can include more or less components than those shown in FIG. 6. For example, the electronic device 600 can include a wired system interface, such as a universal serial bus interface (not shown in FIG. 6). However, the components shown are sufficient to disclose an illustrative embodiment implementing the present invention.

As shown in FIG. 6, the electronic device 600 may comprise a communications antenna 602 for receiving and transmitting Radio Frequency (RF) signals. A receive/transmit (Rx/Tx) switch 604 selectively couples the communications antenna 602 to the transmitter circuitry 606 and receiver circuitry 608 in a manner familiar to those skilled in the art. The receiver circuitry 608 demodulates and decodes the RF signals received from a communications network to derive information therefrom. The receiver circuitry 608 is coupled to a controller 610 via an electrical connection 634. The receiver circuitry 608 provides the decoded RF signal information to the controller 610. The controller 610 uses the decoded RF signal information in accordance with the function(s) of the electronic device 600. For example, if the RF signals include identifier information and/or location information for other electronic devices, then the identifier and/or location information can be used by the controller 610 to identify other devices that are pre-defined distances from or within range of the electronic device 600. The controller 610 also provides information to the transmitter circuitry 606 for encoding and modulating information into RF signals. Accordingly, the controller 610 is coupled to the transmitter circuitry 606 via an electrical connection 638. The transmitter circuitry 606 communicates the RF signals to the antenna 602 for transmission to an external device.

A GPS antenna 640 is coupled to GPS receiver circuitry 614 for receiving GPS signals. The GPS receiver circuitry 614 demodulates and decodes the GPS signals to extract GPS location information therefrom. The GPS location information indicates an estimated location of the client 132, 232, 432, 532. The GPS receiver circuitry 614 provides the decoded GPS location information to the controller 610. As such, the GPS receiver circuitry 614 is coupled to the controller 610 via an electrical connection 636. Notably, the present invention is not limited to GPS based methods for determining a location of the electronic device 600. Other methods for determining a location of a mobile device can be used with the present invention without limitation.

The controller 610 uses the decoded GPS location information in accordance with the function(s) of the client 132, 232, 432, 532. For example, mapping or navigation software executing on the mobile device can use the GPS location information and/or other location information to generate a geographic map showing the location of the client 132, 232, 432, 532. As will be appreciated by those skilled in the art, the GPS location information can also be used to determine a velocity of the mobile device by sensing changes in position with respect to time.

The controller 610 stores the decoded RF signal information and the decoded GPS location information in a memory 612 of the electronic device 600. Accordingly, the memory 612 is connected to and accessible by the controller 610 through an electrical connection 632. The memory 612 can be a volatile memory and/or a non-volatile memory. For example, the memory 612 can include, but is not limited to, a Random Access Memory (RAM), a Dynamic Random Access Memory (DRAM), a Static Random Access Memory (SRAM), Read-Only Memory (ROM) and flash memory. The memory 612 can also have stored therein the software applications 652.

The software applications 652 include, but are not limited to, applications operative to provide network communication services, GPS based services, navigation services, location services, position reporting services, traffic status services, tour information services, commerce services, email services, and/or web based services.

As shown in FIG. 6, one or more sets of instructions 650 are stored in the memory 612. The instructions 650 can also reside, completely or at least partially, within the controller 610 during execution thereof by the electronic device 600. In this regard, the memory 612 and the controller 610 can constitute machine-readable media. The term "machine-readable media", as used here, refers to a single medium or multiple media that store the one or more sets of instructions 650. The term "machine-readable media", as used here, also refers to any medium that is capable of storing, encoding or carrying the set of instructions 650 for execution by the communication device 600 and that cause the electronic device 600 to perform one or more of the methodologies of the present disclosure.

The controller 610 is also connected to a user interface 630. The user interface 630 is comprised of input devices 616, output devices 624, and software routines (not shown in FIG. 2) configured to allow a user to interact with and control software applications 652 installed on the electronic device 600. Such input and output devices respectively include, but are not limited to, a display 628, a speaker 626, a keypad 620, a directional pad (not shown in FIG. 8), a directional knob (not shown in FIG. 8), a microphone 622, a Push-To-Talk ("PTT") button 618, sensors 646, a camera 642 and a Radio Frequency Identification ("RFID") reader 644.

Figure 7:
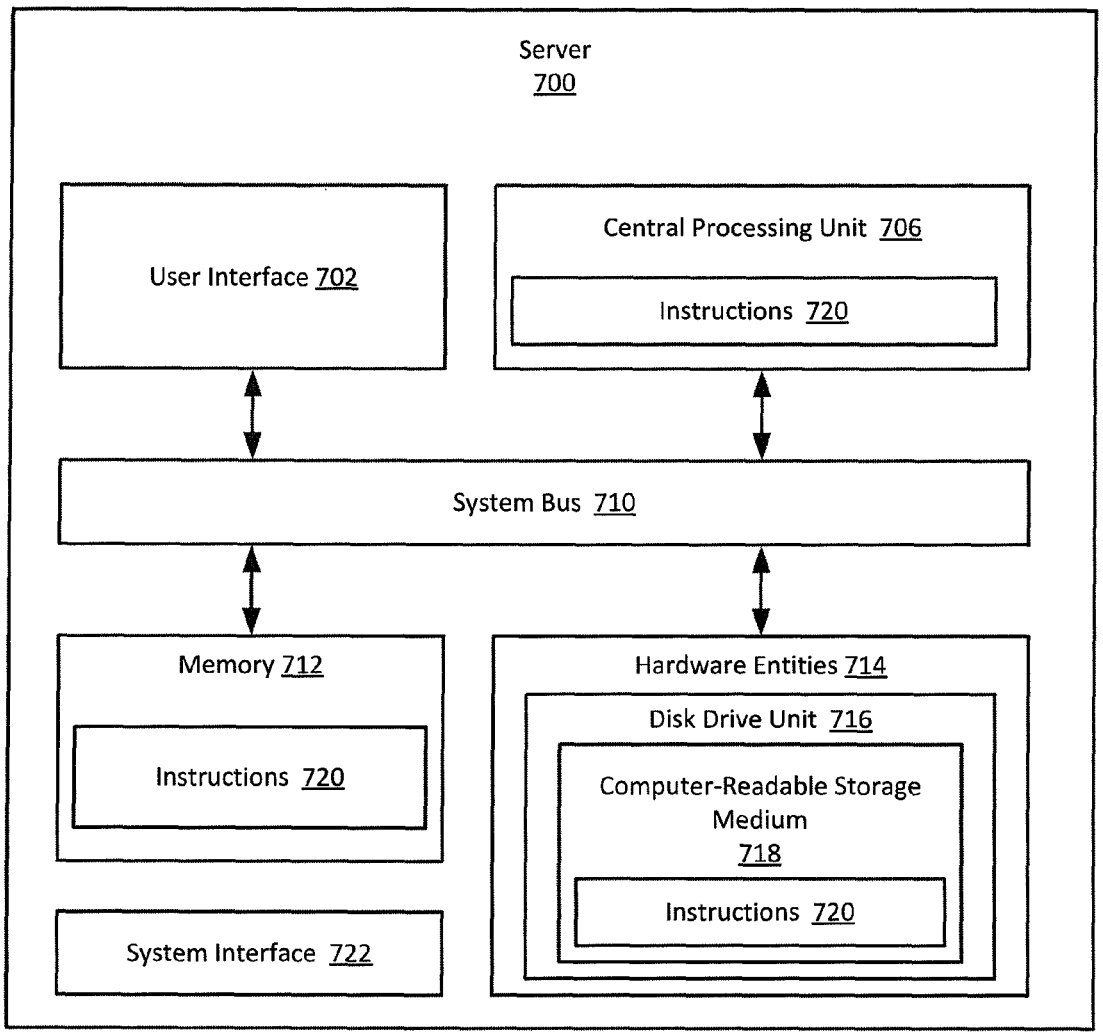
FIG. 7 is a block diagram showing an example server.

Referring now to FIG. 7, there is provided a more detailed block diagram of the server 700 (e.g. server 130, 230, 430, 530). As shown in FIG. 7, the server 700 comprises a system interface 722, a user interface 702, a Central Processing Unit (CPU) 706, a system bus 710, a memory 712 connected to and accessible by other portions of server 700 through system bus 710, and hardware entities 714 connected to system bus 710.

At least some of the hardware entities 714 perform actions involving access to and use of memory 712, which can be a Random Access Memory (RAM), one or more disk drives and/or a Compact Disc Read Only Memory (CD-ROM). Some or all of the listed components 702-722 can be implemented as hardware, software and/or a combination of hardware and software. The hardware includes, but is not limited to, an electronic circuit.

The server 700 may include more, less or different components than those illustrated in FIG. 7. However, the components shown are sufficient to disclose an illustrative embodiment implementing the present invention. The hardware architecture of FIG. 7 represents one embodiment of a representative server configured to facilitate the provision of services to a user of a client communication device (e.g., electronic device 600 of FIG. 6).

Hardware entities 714 can include microprocessors, Application Specific Integrated Circuits (ASICs) and other hardware. Hardware entities 714 can include a microprocessor programmed for facilitating the provision of the automatic software function control services to a user of the client communication device (e.g., electronic device 600 of FIG. 6). In this regard, it should be understood that the microprocessor can access and run various software applications (not shown in FIG. 7) installed on the server 700.

As shown in FIG. 7, the hardware entities 714 can include a disk drive unit 716 comprising a computer-readable storage medium 718 on which is stored one or more sets of instructions 720 (e.g., software code or code sections) configured to implement one or more of the methodologies, procedures, or functions described herein. The instructions 720 can also reside, completely or at least partially, within the memory 712 and/or within the CPU 706 during execution thereof by the server 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the server 700 and that cause the server 700 to perform any one or more of the methodologies of the present disclosure.

System interface 722 allows the server 700 to communicate directly or indirectly with external communication devices (e.g., electronic device 600 of FIG. 6). If the server 700 is communicating indirectly with the external communication device, then the server 700 is sending and receiving communications through a common network.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for detecting that an object, person or vehicle which receives a travel assignment for travel remote from the supervisory control of a controlling authority has deviated from its prescribed route in space or time and guiding it back to the prescribed route according to predefined criteria of strictness established by the controlling authority, comprising the following steps:

(a) operating a mobile client device used in association with the object, person or vehicle to obtain or determine an origin location and obtain a destination location for the object person or vehicle from a controlling authority server computer;

(b) obtaining or determining at the mobile client device a prescribed route to be traversed by the object, person or vehicle, the prescribed route defined in accordance with a graph of travel routes representing a network which may be traversed by the object person or vehicle, said prescribed route determined by minimizing the impedance from the origin location to the destination location, and setting at the mobile device the current route to be traversed equal to the prescribed route;

(c) receiving at the mobile client device proximity criteria and a return-to-route criteria, each selectively assigned by the controlling authority in accordance with at least one variable which can change in accordance with the travel assignment;

(d) determining the current location of the mobile client device using at least one location determining device provided at the mobile client device;

(e) using the location determining device to determine whether the current location of the mobile client device is proximate to the current route in space and time according to the proximity criteria;

(f) if the current location of the mobile client device is proximate to the current route according to the proximity criteria, extracting and displaying with the mobile client device the next maneuver along the current route, but if the current location is not proximate to the prescribed route, operating the mobile client device to determine a current route to the destination according to a degree of strictness as selectively specified by the return-to-route criteria;

(g) repeating steps d through f until either the destination is reached or the method is interrupted.

2. The method according to claim 1 wherein the impedance used to determine the prescribed route and the current route is controlled via avoids and favors of links on the graph representing the network.

3. The method according to claim 2 wherein the avoids and favors are stored in a plurality of sets, and wherein a selection from the plurality of sets applies to a particular object, person, vehicle, cargo or route.

4. The method according to claim 1 wherein the proximity criteria vary according to at least one characteristic of the object, person or vehicle.

5. The method according to claim 1 wherein the return-to-route criteria vary among the prescribed routes according to at least one characteristic of the object, person or vehicle.

6. The method according to claim 1 wherein the proximity criteria vary among the prescribed routes according to at least one characteristic of the person or cargo being transported in the vehicle.

7. The method according to claim 1 wherein the return-to-route criteria vary among the prescribed routes according to at least one characteristic of the person or cargo being transported in the vehicle.

8. The method according to claim 1 wherein the return-to-route criteria vary among the prescribed routes according to at least one characteristic of the destination.

9. The method according to claim 1 wherein the proximity criteria or the return-to-route criteria are determined by more than one said controlling authority, and a hierarchy of authorities is used to determine which authority's criteria will govern in a particular situation.

10. The method according to claim 1 wherein the return-to-route criteria vary among any two or more of the following: the route that returns to the point of deviation from the current location by backtracking along the route of deviation, the route that minimizes impedance from the current location to the point of deviation, the route that minimizes impedance to the nearest point on the prescribed route, the route that minimizes impedance to any of a plurality of nearby points along the prescribed route, and the route that minimizes impedance to the destination.

11. A system for detecting that an object, person or vehicle which receives a travel assignment for travel remote from the supervisory control of a controlling authority has deviated from its planned route in space or time and guiding it back to the planned route according to predefined criteria of strictness established by the controlling authority, comprising:

a server includes at least one data storage device for storing a database representing a physical network of travel routes, and includes at least one computer processing device arranged to facilitate obtaining or determining an origin location, obtaining a destination location, obtaining or determining a prescribed route from the origin location to the destination location along that network, predetermining proximity criteria, and predetermining return-to-route criteria;

a communication interface which facilitates the communication of information between the server and at least one client computing device used in association with the object, person or vehicle and remote from the server;

the client computing device configured to receive the prescribed route, the proximity criteria, and the return-to-route criteria from the server, set a current route equal to the prescribed route, and determine the client's current location;

wherein the client computing device is configured to determines whether the current location is proximate to the current route in space and time according to the proximity criteria and if so extract and display the next maneuver along the current route, but if the current location is not proximate to the current route, then the client computing device determines the current route to the destination according to the return-to-route strictness criteria; and wherein the proximity criteria and the return-to-route criteria are each selectively assigned by the server in accordance with at least one variable which can change in accordance with the travel assignment.

12. The system according to claim 11 wherein the server communicates to the client avoids and favors of links of the physical network, the server using these avoids and favors to determine the prescribed route to the destination, and the client using these same avoids and favors to determine the current route to the destination.

13. The system according to claim 12 wherein the server stores avoids and favors in a plurality of sets, and communicates to the client only those sets which apply to the particular client among a plurality of clients.

14. The system according to claim 11 wherein the proximity criteria vary among the prescribed routes according to at least one characteristic of the object, person or vehicle.

15. The system according to claim 11 wherein the return-to-route criteria vary among the prescribed routes according to at least one characteristic of the object, person or vehicle.

16. The system according to claim 11 wherein the proximity criteria vary among the prescribed routes according to at least one characteristic of the person or cargo being transported in the vehicle.

17. The system according to claim 11 wherein the return-to-route criteria vary among the prescribed routes according to at least one characteristic of the person or cargo being transported in the vehicle.

18. The system according to claim 11 wherein the return-to-route criteria vary among the prescribed routes according to at least one characteristic of the destination.

19. The system according to claim 11 wherein proximity criteria or return-to-route criteria are determined by more than one controlling authority, and a hierarchy of authorities is used by the client computing device to determine which authority's criteria will govern in a particular situation.

20. The system according to claim 11 wherein the return-to-route criteria vary among any two or more of the following: the route that returns to the point of deviation from the current location by backtracking along the route of deviation, the route that minimizes impedance from the current location to the point of deviation, the route that minimizes impedance to the nearest point on the prescribed route, the route that minimizes impedance to any of a plurality of nearby points along the prescribed route, and the route that minimizes impedance to the destination.

21. The system according to claim 11 wherein the client stores the prescribed route, proximity criteria, and return-to-route criteria in nonvolatile memory, and upon reboot of the client, the client reads the prescribed route, proximity criteria, and return-to-route criteria from nonvolatile memory, then resumes processing by setting the current route equal to the prescribed route.

22. The system according to claim 11 wherein the client writes to nonvolatile memory a log of out of route events, such events beginning when the current location is first detected as not proximate to the prescribed route, and ending when the current location is next detected as proximate to the prescribed route.

* * * * *